US012658340B2

(12) United States Patent　(10) Patent No.:　US 12,658,340 B2
Yamanouchi et al.　(45) Date of Patent:　Jun. 16, 2026

(54) WIRE HARNESS

(71) Applicants: SUMITOMO WIRING SYSTEMS, LTD., Yokkaichi (JP); HONDA MOTOR CO., LTD., Tokyo (JP)

(72) Inventors: Hiroki Yamanouchi, Yokkaichi (JP); Masataka Ohashi, Tokyo (JP); Kotaro Tagami, Tokyo (JP)

(73) Assignees: SUMITOMO WIRING SYSTEMS, LTD., Yokkaichi (JP); HONDA MOTOR CO., LTD., Tokyo (JP)

( * ) Notice: Subject to any disclaimer, the term of this patent is extended or adjusted under 35 U.S.C. 154(b) by 171 days.

(21) Appl. No.: 18/432,089

(22) Filed: Feb. 5, 2024

(65) Prior Publication Data

US 2024/0282481 A1　Aug. 22, 2024

(30) Foreign Application Priority Data

Feb. 21, 2023　(JP) ................................. 2023-025246

(51) Int. Cl.
　*H01B 7/24*　(2006.01)
　*B60R 16/02*　(2006.01)
　*H01B 7/00*　(2006.01)
(52) U.S. Cl.
　CPC ....... *H01B 7/0045* (2013.01); *B60R 16/0215* (2013.01); *H01B 7/24* (2013.01)

(58) Field of Classification Search
　CPC .... B60R 16/0215; H01B 7/0045; H01B 7/24; H01B 7/40; H02G 3/04
　See application file for complete search history.

(56) References Cited

U.S. PATENT DOCUMENTS

| | | | |
|---|---|---|---|
| 2015/0041175 A1 | 2/2015 | Nakai et al. | |
| 2017/0076841 A1 | 3/2017 | Nakai et al. | |
| 2022/0258682 A1* | 8/2022 | Yamanouchi | ........ H02G 3/0468 |
| 2022/0285045 A1* | 9/2022 | Iwama | ................... H01B 7/185 |
| 2023/0291186 A1* | 9/2023 | Tsukimori | ............ H02G 3/0481 |
| 2023/0415674 A1* | 12/2023 | Yamanouchi | ........... B60R 16/02 |

\* cited by examiner

*Primary Examiner* — Paresh Paghadal

(57)　ABSTRACT

A wire harness includes a tubular member, an electric wire member, a cover member, and a holder. The electric wire member includes electric wires connected to each other. The electric wires each have a core wire covered by an insulation sheath. The cover member covers a circumference of a connected part of the electric wires. The electric wire member is inserted through the tubular member. The holder is tubular and is arranged at an end part of the tubular member to protect the electric wire member at a part where the cover member is arranged. The electric wire member includes a double-insulation portion where the core wire is covered by the insulation sheath and the cover member. The holder includes a hollow portion in a part where the double-insulation portion is located.

10 Claims, 9 Drawing Sheets

WIRE HARNESS

BACKGROUND

1. Field

The following description relates to a wire harness.

2. Description of Related Art

Japanese Laid-Open Patent Publication No. 2015-35915 discloses a known wire harness used in a hybrid electric vehicle or the like. Such wire harness includes, for example, a metal shield pipe arranged under the floor of a vehicle and electric wires extending through the shield pipe. Each end of the shield pipe is fitted with a plastic holder that protects insulation covering of the electric wires from damage.

SUMMARY

In such vehicle, an increasing number of electric wires may be inserted through the shield pipe as a result of an increasing variety of the electrical functionalities. Further, the electric wires may be increased in diameter to allow a large current to flow depending on the type of electric component. This increases the ratio of the space occupied by the electric wires inside the shield pipe, or the cable fill ratio. This may lower efficiency when inserting the electric wires through the shield pipe.

An objective of the present disclosure is to provide a wire harness that improves efficiency for inserting electric wires through a tubular member.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wire harness includes an electric wire member, a cover member, a tubular member, and a holder. The electric wire member includes electric wires connected to each other. The electric wires each have a core wire covered by an insulation sheath. The cover member covers a circumference of a connected part of the electric wires. The electric wire member is inserted through the tubular member. The holder is tubular and is arranged at an end part of the tubular member. The holder protects the electric wire member at a part where the cover member is arranged. The electric wire member includes a double-insulation portion where the core wire is covered by the insulation sheath and the cover member. The holder includes a hollow portion at a part where the double-insulation portion is located.

The present disclosure improves efficiency for inserting the electric wires through the tubular member.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
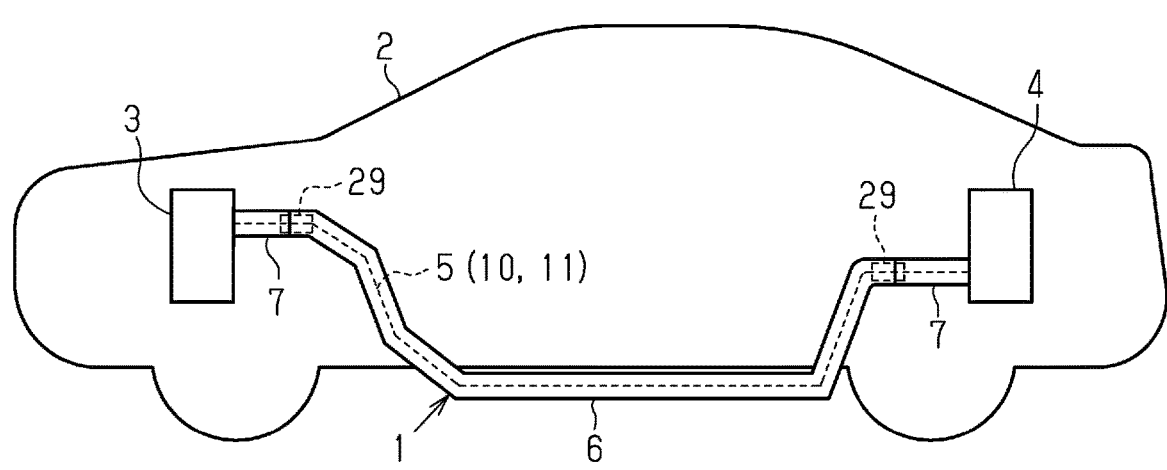
FIG. 1 is a diagram of a wire harness arranged in a vehicle.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Embodiment of the present disclosure will now be described (1) A wire harness in accordance with the present disclosure includes an electric wire member, a cover member, a tubular member, and a holder. The electric wire member includes electric wires connected to each other. The electric wires each have a core wire covered by an insulation sheath. The cover member covers a circumference of a connected part of the electric wires. The electric wire member is inserted through the tubular member. The holder is tubular and is arranged at an end part of the tubular member to protect the electric wire member at a part where the cover member is arranged. The electric wire member includes a double-insulation portion where the core wire is covered by the insulation sheath and the cover member. The holder includes a hollow portion at a part where the double-insulation portion is located.

With the present structure, the holder includes the hollow portion at the part where the double-insulation portion is located so as to decrease the cable fill ratio in the tubular member. Specifically, the hollow portion reduces the outer diameter of the holder at a part where the hollow portion is located, which is the position where the electric wire member is relatively thick in the radial direction in the tubular member. This improves the efficiency for inserting the electric wire member through the tubular member.

(2) In the wire harness according to (1), the electric wires include a first electric wire and a second electric wire connected to the first electric wire. The double-insulation portion includes a first double-insulation portion where a first core wire of the first electric wire is covered by a first insulation sheath of the first electric wire and the cover member, and a second double-insulation portion where a second core wire of the second electric wire is covered by a second insulation sheath of the second electric wire and the cover member. The hollow portion is located in the holder in at least one of a part where the first double-insulation portion is located and a part where the second double-insulation portion is located. With this structure, the hollow portion reduces the outer diameter of the holder at a part where the hollow portion is located even when the electric wire member includes two double-insulation portions, namely, the first double-insulation portion and the second double-insulation portion, at the connected parts of the electric wires. This decreases the cable fill ratio in the tubular member at the part where the double-insulation portion of the electric wire member is located.

(3) In the wire harness according to (2), the electric wire member includes a joint including an end portion of the first core wire exposed from the first insulation sheath and an end portion of the second core wire exposed from the second insulation sheath joined with the end portion of the first core wire. The joint is thinner than the first core wire and the second core wire. The electric wire member includes a single-insulation portion where at least the joint is covered by only the cover member. With this structure, the single-insulation portion at the joint is disposed toward the center axis of the holder so that the single-insulation portion is separated from the tubular member. Thus, the single-insulation portion will not come into contact with the tubular member, thereby avoiding damage to the single-insulation portion.

(4) In the wire harness according to (3), the first core wire includes a plurality of metal strands. The second core wire is a single-core wire. The joint includes ends of the metal strands and a flat portion of an end of the single-core wire joined with the ends of the metal strands. With this structure, the first electric wire is flexible, and the second electric wire is rigid. Thus, the electric wire member includes the first electric wire that is flexible and the second electric wire that is rigid.

(5) In the wire harness according to any one of (1) to (4), the holder is polygonal as viewed in an axial direction and includes a plurality of corners arranged in a circumferential direction. The hollow portion is included in at least one of the corners. With this structure, the electric wire member is arranged along the inner surface of the corner of the polygonal holder. The hollow portion is included in the part where the electric wire member is in contact with the holder so that the hollow portion reduces the outer diameter of the holder at the position of the hollow portion. This decreases the cable fill ratio in the tubular member at the part where the double-insulation portion of the electric wire member is located.

(6) In the wire harness according to any one of (1) to (5), the hollow portion extends in the axial direction of the holder and includes two opening ends at opposite sides of the hollow portion. The hollow portion has an opening length that is set so that the double-insulation portion does not come into contact with the opening ends of the hollow portion even when the electric wire member is moved inside the holder in the axial direction of the holder. With this structure, even when the electric wire member is moved in the axial direction inside the holder, the double-insulation portion will remain separated from the opening ends. This avoids damage to the double-insulation portion.

(7) In the wire harness according to any one of (1) to (6), the holder includes a rotation restriction configured to restrict rotation of the electric wire member inside the holder in a circumferential direction. With this structure, the rotation restriction of the holder positions the electric wire member, which is inserted into the holder, in the circumferential direction. Accordingly, the electric wires will contact the inner surface of a bend of the tubular member in a uniform manner. This avoids damage to the insulation sheath.

(8) In the wire harness according to any one of (1) to (7), the holder includes a positioning member used to position the holder relative to the tubular member at the end part of the tubular member. With this structure, the positioning member positions the holder on the tubular member so that the holder and the electric wire member, which is arranged in the holder, will be held in place. This further avoids damage to the insulation sheath.

(9) In the wire harness according to any one of (1) to (8), the electric wire member includes a plurality of electric wire members. With this structure, the electric wire members may increase the outer diameter of the holder. However, the hollow portion included in the holder reduces the outer diameter of the holder at a part where the hollow portion is located. This sufficiently avoids a situation in which the cable fill ratio in the tubular member becomes high at the part where the double-insulation portion of the electric wire members is located.

DETAILED DESCRIPTION OF EMBODIMENT OF PRESENT DISCLOSURE

A specific example of the present disclosure will now be described with reference to the drawings. The present invention is not limited to the illustrated embodiment and intended to be defined by the claims and their equivalents, and all variations within the scope of the claims and their equivalents. To facilitate understanding, configurations may be partially exaggerated or simplified in the drawings. Further, elements in the drawings may not be to scale.

Wire Harness 1

As shown in FIG. 1, a vehicle 2 includes a wire harness 1 as one type of electrical wiring of the vehicle 2. The wire harness 1 electrically connects a first electric component 3 and a second electric component 4 that are arranged in the vehicle 2. The wire harness 1 includes a wire bundle 5, a tubular member 6, and sleeves 7. The wire bundle 5 connects the first electric component 3 and the second electric component 4. The wire bundle 5 is inserted into the tubular member 6. Each sleeve 7 surrounds the wire bundle 5 extending out of a corresponding one of the ends of the tubular member 6. The tubular member 6 is partially laid out at an outer side of the vehicle floor surface.

The wire harness 1 is, for example, laid out two-dimensionally or three-dimensionally. For example, the wire bundle 5 is inserted through the tubular member 6. Then, the tubular member 6 is bent together with the accommodated wire bundle 5 such that the wire harness 1 has a desired bent shape. Each sleeve 7 is, for example, a corrugated tube, a waterproof cover, or the like. The tubular member 6 and the sleeves 7 protect the wire bundle 5 accommodated in the tubular member 6 from flying objects and water. The vehicle 2 is, for example, a battery electric vehicle (BEV), a hybrid electric vehicle (HEV), or a plug-in hybrid electric vehicle (PHEV).

Figure 3:
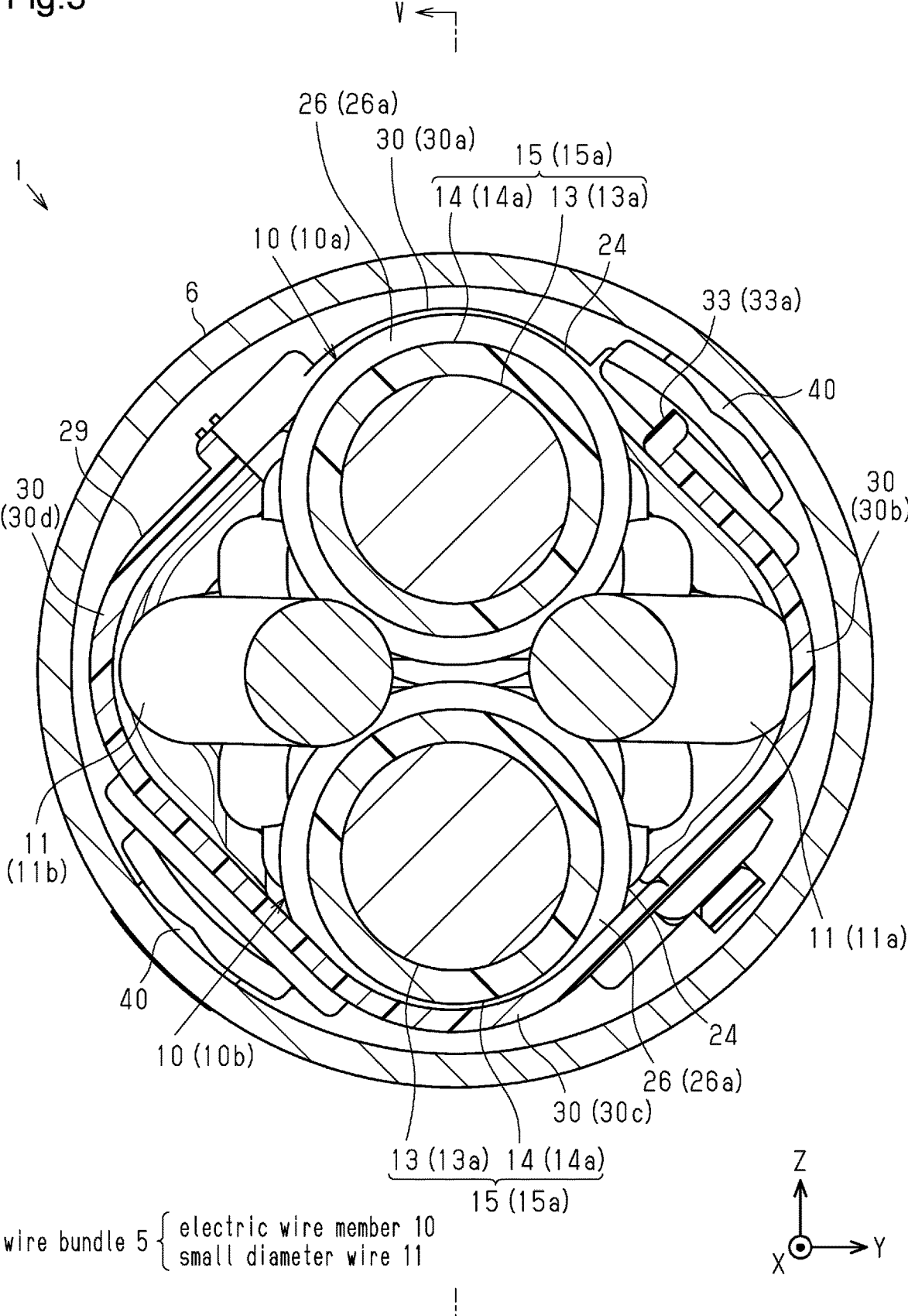
FIG. 3 is a cross-sectional view taken along line III-III shown in FIG. 5.
Figure 4:
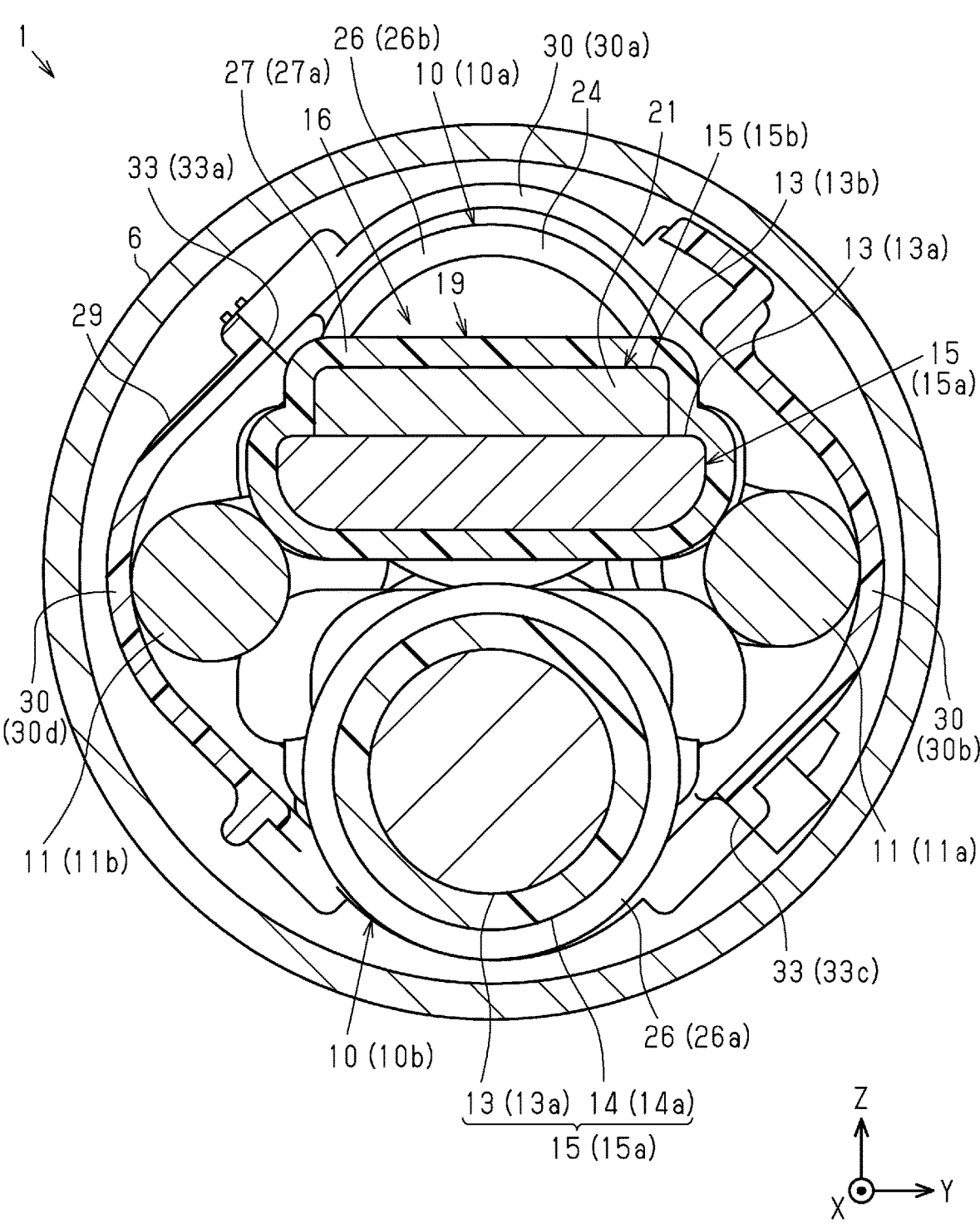
FIG. 4 is a cross-sectional view taken along line IV-IV shown in FIG. 5.

As shown in FIGS. 3 and 4, the wire bundle 5 includes an electric wire member 10 and a small diameter wire 11 having a smaller diameter than the electric wire member 10. The electric wire member 10 is, for example, a high-voltage electric wire. The small diameter wire 11 is, for example, an alternating current wire. The illustrated example includes more than one electric wire member 10 (two) and more than one small diameter wire 11 (two). One of the two electric wire members 10 will be referred to as the first electric wire member 10a, and the other one of the electric wire members 10 will be referred to as the second electric wire member 10b. One of the first electric wire member 10a and the second electric wire member 10b is a positive wire, and the other one of the first electric wire member 10a and the second electric wire member 10b is a negative wire. One of the two small diameter wires 11 will be referred to as the first small diameter wire 11a, and the other one of the two small diameter wires 11 will be referred to as the second small diameter wire 11b. The electric wire members 10 and the small diameter wires 11 may each be, for example, either a shielded wire or non-shielded wire.

The first electric wire member 10a and the second electric wire member 10b are arranged inside the tubular member 6 and are in contact with each other. In the tubular member 6, the first small diameter wire 11a is arranged at one side of the first electric wire member 10a and the second electric wire member 10b (right side in FIG. 3 and right side in FIG. 4). In the tubular member 6, the second small diameter wire 11b is arranged at the other side of the first electric wire member 10a and the second electric wire member 10b (left side in FIG. 3 and right side in FIG. 4).

The tubular member 6 is, for example, an elongated tube having a plurality of bends. The tubular member 6 is, for example, cylindrical. The tubular member 6 accommodates, for example, an intermediate portion of the wire bundle 5. The tubular member 6 may be, for example, a metal pipe, a plastic pipe, a corrugated plastic tube, a waterproof cover formed from rubber, or a combination of these elements. In the present example, the tubular member 6 is a metal pipe.

Electric Wire Member 10

Figure 2:
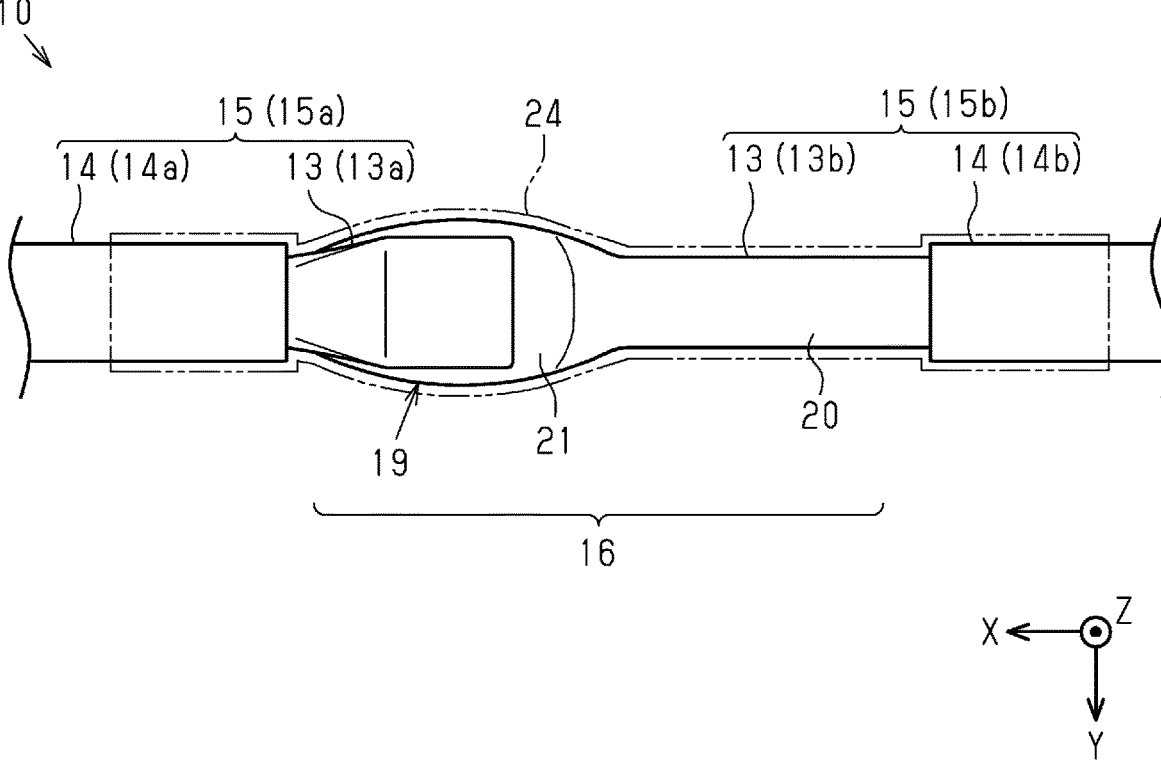
FIG. 2 is a plan view showing a joint of an electric wire member.

As shown in FIG. 2, the electric wire member 10 is formed by connecting electric wires 15, each having a core wire 13 that is covered by an insulation sheath 14. In the present example, the electric wires 15 include a first electric wire 15a and a second electric wire 15b that is connected to the first electric wire 15a. In the present example, the electric wires 15 form a single line by connecting a first electric wire 15a to each end of the second electric wire 15b. FIG. 2 shows only one of two connected parts 16 where the first electric wire 15a is connected to the second electric wire 15b at two opposite sides of the electric wire member 10.

The first electric wire 15a is, for example, a flexible electric wire. The first electric wire 15a includes a first core wire 13a and a first insulation sheath 14a that covers the circumference of the first core wire 13a. The first core wire 13a is, for example, a wire including metal strands. The first core wire 13a may be, for example, a stranded wire formed by twisting metal strands or a braided wire formed by braiding metal strands into a tubular shape. The material of the first core wire 13a is, for example, a metal material that is copper-based, aluminum-based, or the like. The first core wire 13a has a circular cross section.

The first insulation sheath 14a covers, for example, the entire circumferential surface of the first core wire 13a. The first insulation sheath 14a is formed from, for example, an insulation material such as synthetic resin. The material of the first insulation sheath 14a is, for example, a polyolefin-based resin such as cross-linked polyethylene or cross-linked polypropylene.

The second electric wire 15b has a higher rigidity than the first electric wire 15a. The second electric wire 15b includes a second core wire 13b and a second insulation sheath 14b that covers the circumference of the second core wire 13b. The second core wire 13b is a single-core wire. The second core wire 13b is a column-shaped conductor formed by, for example, a solid metal rod, a tubular conductor, or the like. The material of the second core wire 13b is, for example, a metal material that is copper-based, aluminum-based, or the like. The second core wire 13b may be formed from the same material as the first core wire 13a. For example, the second core wire 13b has a circular cross section except for the ends.

The second insulation sheath 14b covers, for example, the entire circumferential surface of the second core wire 13b. The second insulation sheath 14b is formed from, for example, an insulation material such as synthetic resin. The material of the second insulation sheath 14b is, for example, a polyolefin-based resin such as cross-linked polyethylene or cross-linked polypropylene. The second insulation sheath 14b may be, for example, a heat-shrinkable tube or a rubber tube.

Joint 19

As shown in FIG. 2, the electric wire member 10 includes a joint 19 at the connected part 16 of the two electric wires 15. In the present example, the joint 19 is formed by joining the end portion of the first core wire 13a exposed from the first insulation sheath 14a and the end portion of the second core wire 13b exposed from the second insulation sheath 14b. FIG. 2 shows only one of the two joints 19 located at opposite sides of the single electric wire member 10.

The joint 19 is formed by bonding the first core wire 13a and the second core wire 13b that are arranged one over the other in a direction (Z-axis direction in FIG. 2) orthogonal to a longitudinal direction (X-axis direction in FIG. 2) of the electric wire member 10. For example, ultrasonic welding or laser welding is performed in the joining process.

Figure 5:
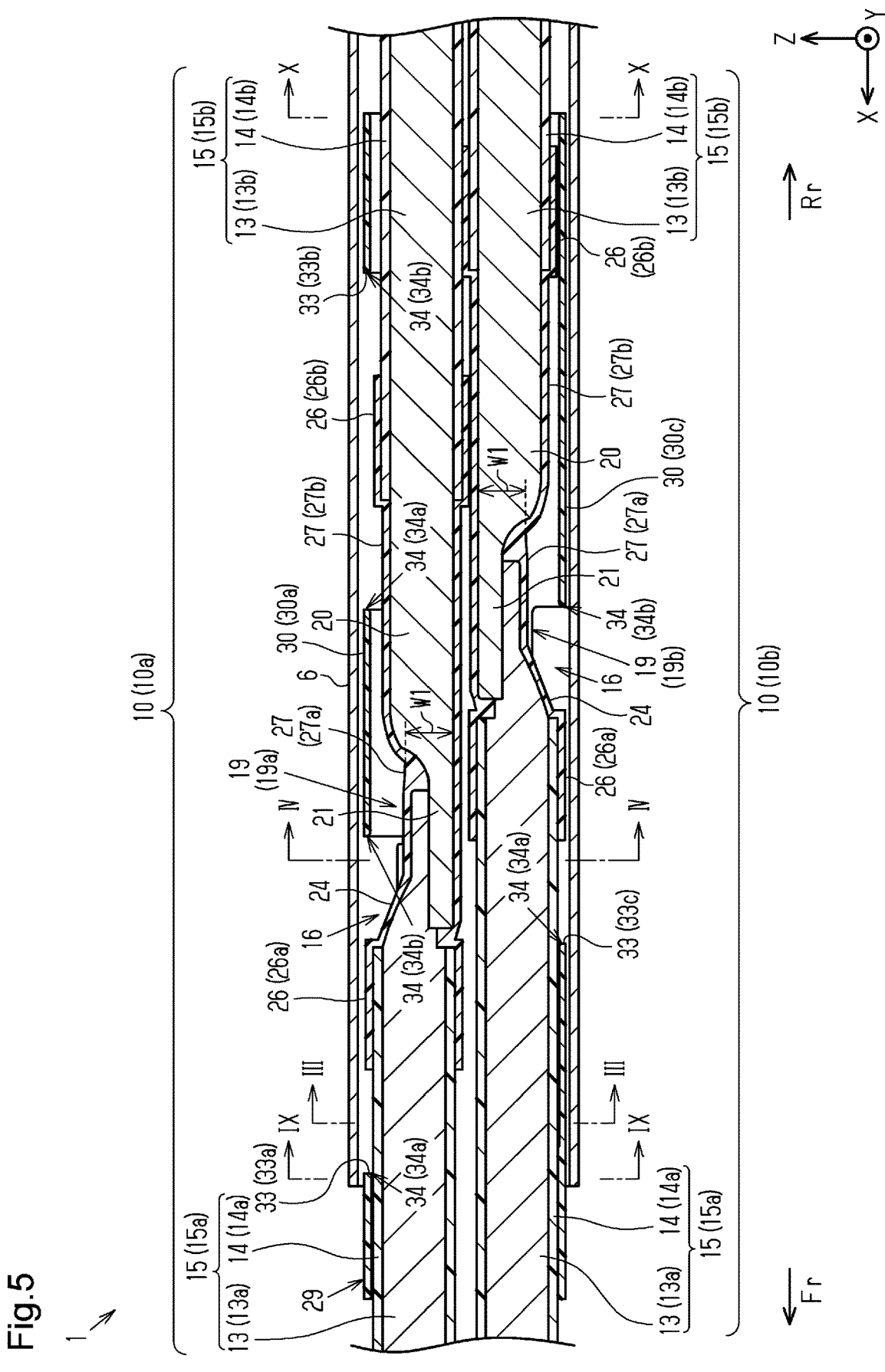
FIG. 5 is a cross-sectional view taken along line V-V shown in FIG. 3.

FIG. 5 shows the internal structure of the wire harness 1. FIG. 5 is a cross-sectional view showing an end part of the tubular member 6 located toward the front of the vehicle body. In FIG. 5, the left side corresponds to the front side (side Fr) of the vehicle body and the right side corresponds to the rear side (side Rr) of the vehicle body.

The joint 19 is formed by joining ends of the metal strands (first core wire 13a) and a flat portion 21 at a distal end of a columnar portion 20 of the single-core wire (second core wire 13b). The joint 19 has a thickness W1 that is less than the thickness of the first core wire 13a and the thickness of the second core wire 13b. The columnar portion 20 has the form of, for example, a narrow cylinder. The columnar portion 20 is mostly covered by the second insulation sheath 14b, and only a predetermined amount of the distal end of the columnar portion 20 is exposed from the second insulation sheath 14b. The flat portion 21 is, for example, arranged toward the center axis of the holder 29.

The joint 19 includes, for example, a first joint 19a of the first electric wire member 10a, and a second joint 19b of the second electric wire member 10*b*. The first joint 19*a* and the second joint 19*b* are located at different positions in a lengthwise direction (X-axis direction in FIG. 5) of the electric wire members 10 such that the first joint 19*a* and the second joint 19*b* do not overlap each other in a bundling direction (Z-axis direction in FIG. 5) of the electric wire members 10. The first joint 19*a* and the second joint 19*b* are both arranged toward the center axis of the tubular member 6.

Cover Member 24

As shown in FIGS. 3 to 5, the wire harness 1 includes a cover member 24 that covers the circumference of the connected part 16 of the electric wires 15. For example, the cover member 24 has the form of a long tube. For example, the cover member 24 covers the joint 19 and its periphery. Specifically, the cover member 24 covers the end of the first insulation sheath 14*a*, the first core wire 13*a* exposed from the end of the first insulation sheath 14*a*, the end of the second insulation sheath 14*b*, and the second core wire 13*b* exposed from the end of the second insulation sheath 14*b*.

The cover member 24 is used to, for example, electrically insulate the joint 19, the first core wire 13*a*, the second core wire 13*b*, and the like. Also, the cover member 24 is used to protect the joint 19, the first core wire 13*a*, and the second core wire 13*b* from water. The cover member 24 is, for example, a shrinkable tube, a rubber tube, a resin mold, a hot-melt adhesive, a tape, or the like. In the present example, the cover member 24 is a heat-shrinkable tube. The cover member 24 is formed from, for example, synthetic resin of which the main component is a polyolefin-based resin, such as cross-linked polyethylene or cross-linked polypropylene.

Double-Insulation Portion 26

As shown in FIG. 5, the electric wire member 10 includes a double-insulation portion 26 where the core wire 13 is covered by the insulation sheath 14 and the cover member 24. In the present example, the double-insulation portion 26 includes a first double-insulation portion 26*a* where the first core wire 13*a* is covered by the first insulation sheath 14*a* and the cover member 24, and a second double-insulation portion 26*b* where the second core wire 13*b* is covered by the second insulation sheath 14*b* and the cover member 24. The first double-insulation portion 26*a* refers to an end portion of the first electric wire 15*a* where the outer circumferential surface of the first core wire 13*a* is covered by the first insulation sheath 14*a* and the cover member 24. The second double-insulation portion 26*b* refers to an end portion of the second electric wire 15*b* where the outer circumferential surface of the second core wire 13*b* is covered by the second insulation sheath 14*b* and the cover member 24.

The electric wire member 10 includes a single-insulation portion 27 where the core wire 13 of the electric wire member 10 is covered by only the cover member 24. The single-insulation portion 27 refers to, for example, a portion of the first core wire 13*a* exposed from the first insulation sheath 14*a* and covered by only the cover member 24, and a portion of the second core wire 13*b* exposed from the second insulation sheath 14*b* and covered by only the cover member 24. The single-insulation portion 27 includes a first single-insulation portion 27*a* where the circumference of the joint 19 is covered and a second single-insulation portion 27*b* where the columnar portion 20 exposed from the second insulation sheath 14*b* is covered.

Holder 29

Figure 6:
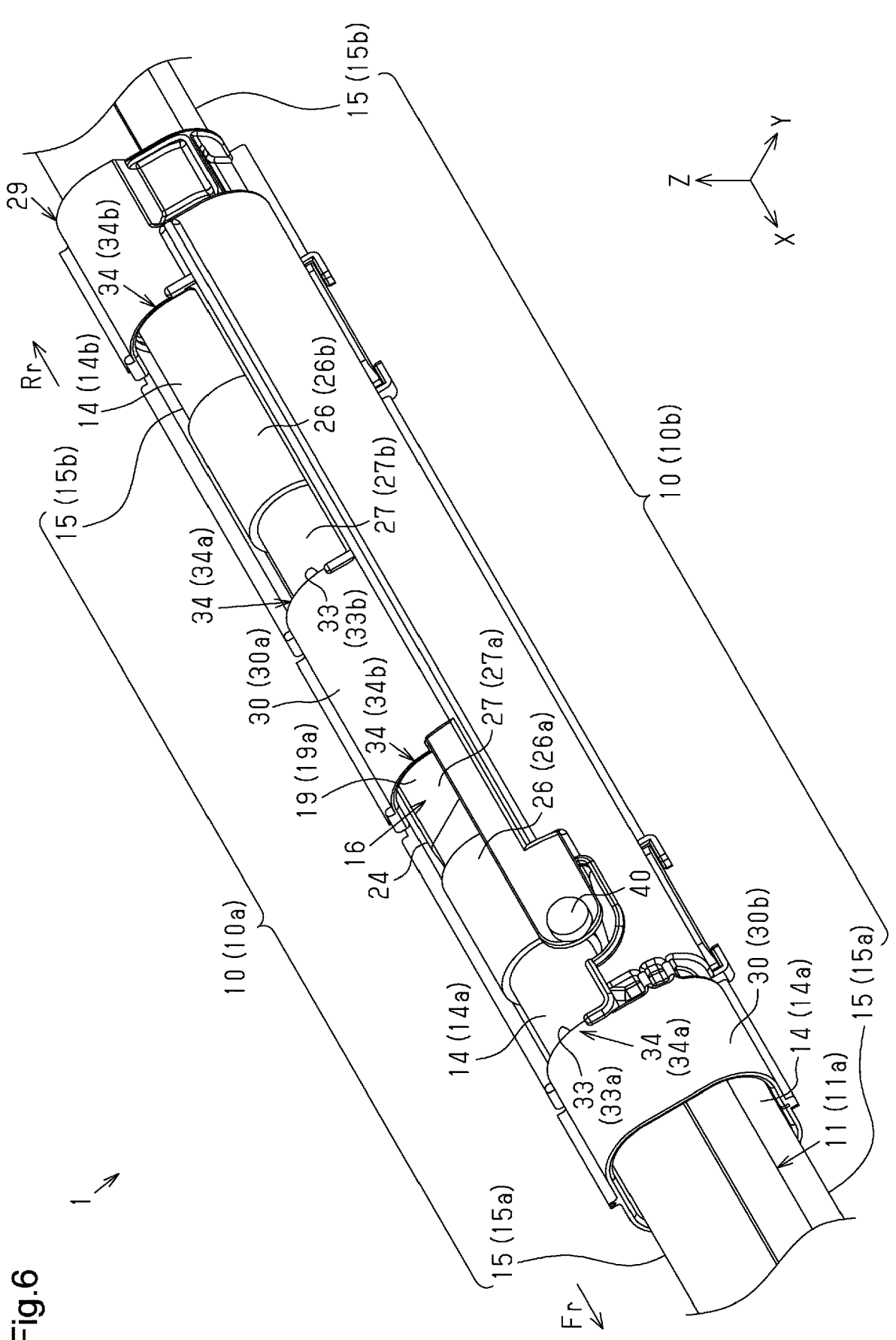
FIG. 6 is a perspective view of the wire harness.

As shown in FIGS. 5 and 6, the wire harness 1 includes a tubular holder 29 arranged at an end part of the tubular member 6. The holder 29 protects the electric wire member 10 at a part where the cover member 24 is arranged. The wire bundle 5 is inserted into the holder 29. More specifically, the first electric wire member 10*a*, the second electric wire member 10*b*, the first small diameter wire 11*a*, and the second small diameter wire 11*b* are inserted into the holder 29. FIGS. 5 and 6 show only one of the two holders 29 arranged at the two ends of the tubular member 6.

The holder 29 has the form of, for example, a tube with two open ends. The holder 29 protects the wire bundle 5 at the tube end of the tubular member 6 (open edge of tubular member 6). The holder 29 further protects the joint 19 of the first electric wire 15*a* and the second electric wire 15*b*. The holder 29 is formed from, for example, synthetic plastic. The material of the holder 29 is, for example, synthetic resin such as polyolefin, polyamide, polyester, acrylonitrile butadiene styrene (ABS) resin, or the like.

As shown in FIGS. 3 and 4, the holder 29 is polygonal (in the present example, quadrangular) as viewed in the axial direction (X-axis direction in FIGS. 3 and 4) and includes a plurality of corners 30 in the circumferential direction. In the present example, the corners 30 include a first corner 30*a* located at the upper side as viewed in the drawing, a second corner 30*b* located at a position shifted from the first corner 30*a* by ninety degrees in the clockwise direction, a third corner 30*c* located at a position opposite to the first corner 30*a*, and a fourth corner 30*d* located at a position shifted from the first corner 30*a* by ninety degrees in the counter-clockwise direction. In the present example, the first electric wire member 10*a* is arranged on an inner surface of the first corner 30*a* inside the holder 29. The second electric wire member 10*b* is arranged on an inner surface of the third corner 30*c* inside the holder 29.

Hollow Portion 33 of Holder 29

As shown in FIGS. 3 to 6, the holder 29 includes a hollow portion 33 in a part where the double-insulation portion 26 is located. In the present example, the hollow portion 33 is an opening in the holder 29, and the hollow portion 33 can be referred to as a window or a side window of the holder 29. For example, the hollow portion 33 is rectangular in plan view, with the long sides of the rectangle defining a longitudinal direction and the short sides defining a latitudinal direction. The hollow portion 33 is included in the part of the holder 29 where the electric wire member 10 is relatively thick in the radial direction, that is, where the double-insulation portion 26 of the electric wire member 10 is located. In this manner, the outer diameter of the holder 29 is reduced at a part where the hollow portion 33 is provided. In other words, the hollow portion 33 decreases the cable fill ratio in the tubular member 6 at the part where the double-insulation portions 26 of the electric wire member 10 is located.

As shown in FIGS. 3 and 4, the hollow portion 33 is formed in the corners 30, which are arranged in the circumferential direction of the holder 29, at where the double-insulation portions 26 are located. More specifically, the hollow portion 33 is formed in the first corner 30*a*, which is in contact with the first electric wire member 10*a*, and the third corner 30*c*, which is in contact with the second electric wire member 10*b*. The hollow portion 33 formed in the first corner 30*a* is for the first electric wire member 10*a*, and the hollow portion 33 formed in the third corner 30*c* is for the second electric wire member 10*b*.

As shown in FIGS. 5 and 6, the hollow portion 33 is included in the holder 29 where at least one of a part where the first double-insulation portion 26*a* is located and a part where the position of the second double-insulation portion 26*b* is located. In the present example, the hollow portion 33 for the first electric wire member 10*a* is located where both the part where the first double-insulation portion 26a is located and the part where the second double-insulation portion 26b is located. Specifically, the holder 29 for the first electric wire member 10a includes a first hollow portion 33a formed at the part where the first double-insulation portion 26a is located, and a second hollow portion 33b formed at the part where the second double-insulation portion 26b is located.

Figure 7:
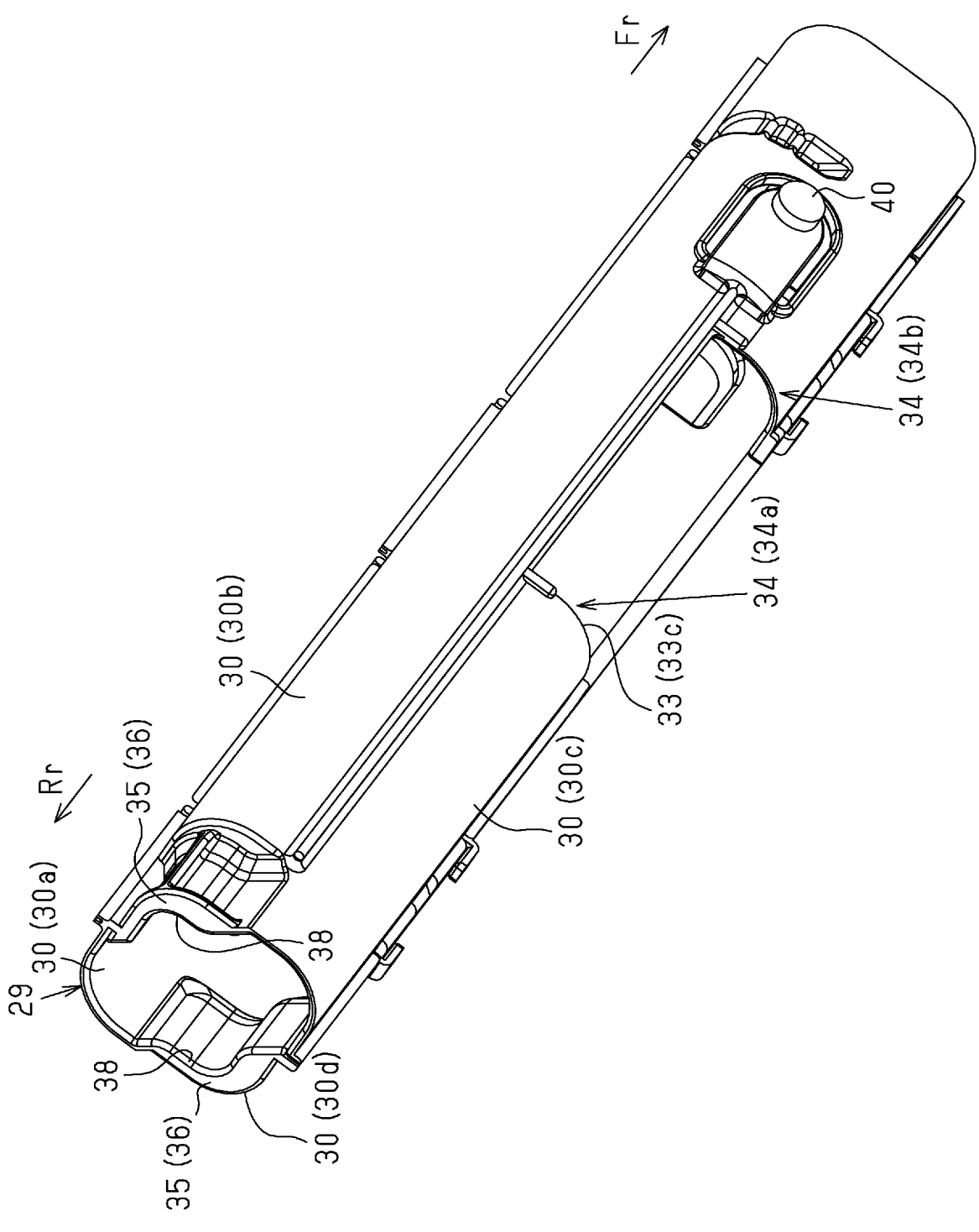
FIG. 7 is a perspective view of a holder.

As shown in FIGS. 5 and 7, the hollow portion 33 for the second electric wire member 10b is located at only the part where the first double-insulation portion 26a is located. Specifically, the holder 29 for the second electric wire member 10b includes a third hollow portion 33c at the part where the first double-insulation portion 26a is located. There is only one hollow portion 33 for the second electric wire member 10b because the second core wires 13b have a relatively small diameter and the hollow portions 33 for the first electric wire member 10a provide sufficient space.

Opening Length L of Hollow Portion 33

As shown in FIGS. 5 to 7, each hollow portion 33 has two opening ends 34 at opposite sides in the longitudinal direction of the opening (X-axis direction in FIG. 5). In the present example, the opening ends 34 include a first opening end 34a located toward the distal end of the holder 29 and a second opening end 34b located toward the proximal end of the holder 29.

Figure 8A:
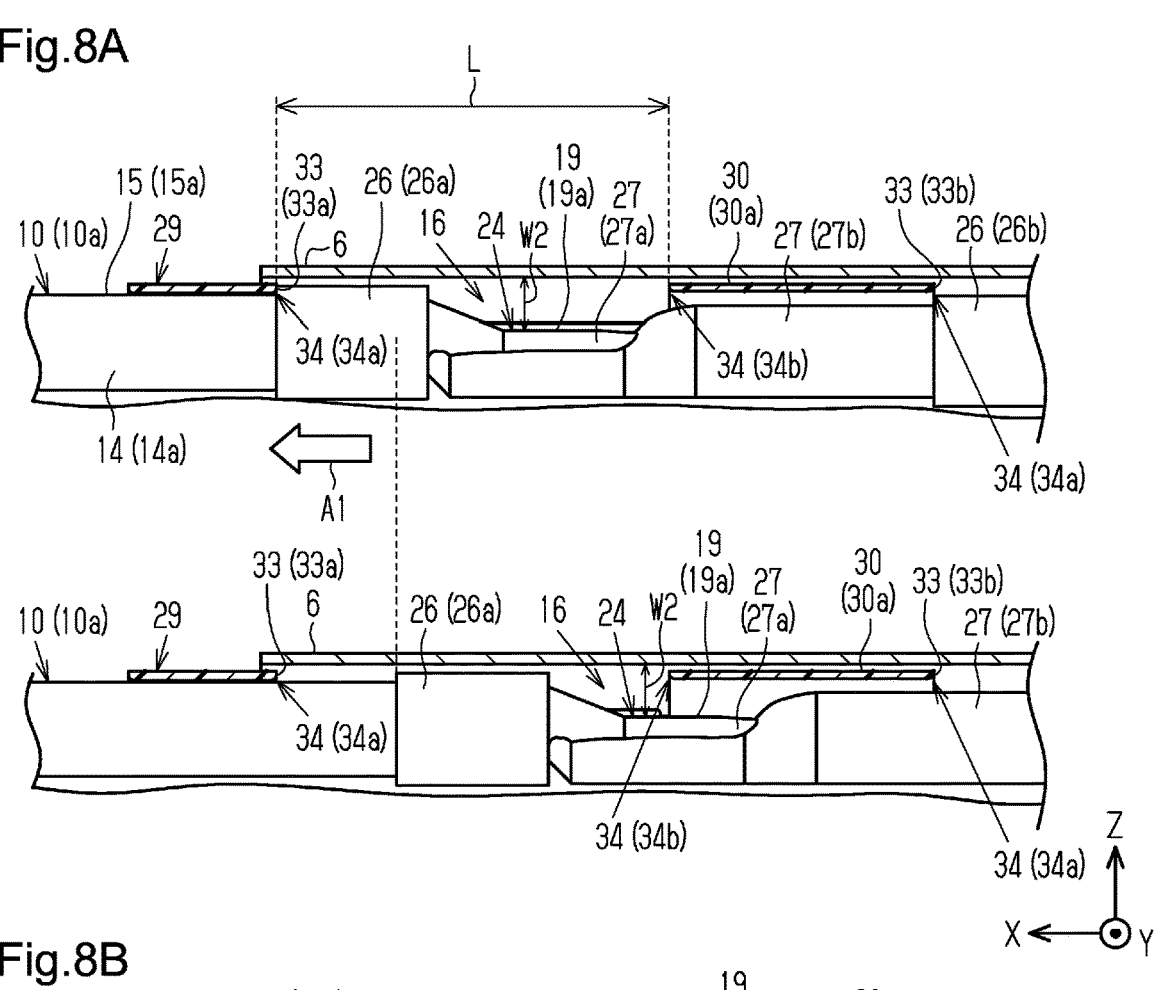
FIGS. 8A and 8B are diagrams illustrating movement of the electric wire member in the holder.
Figure 8B:
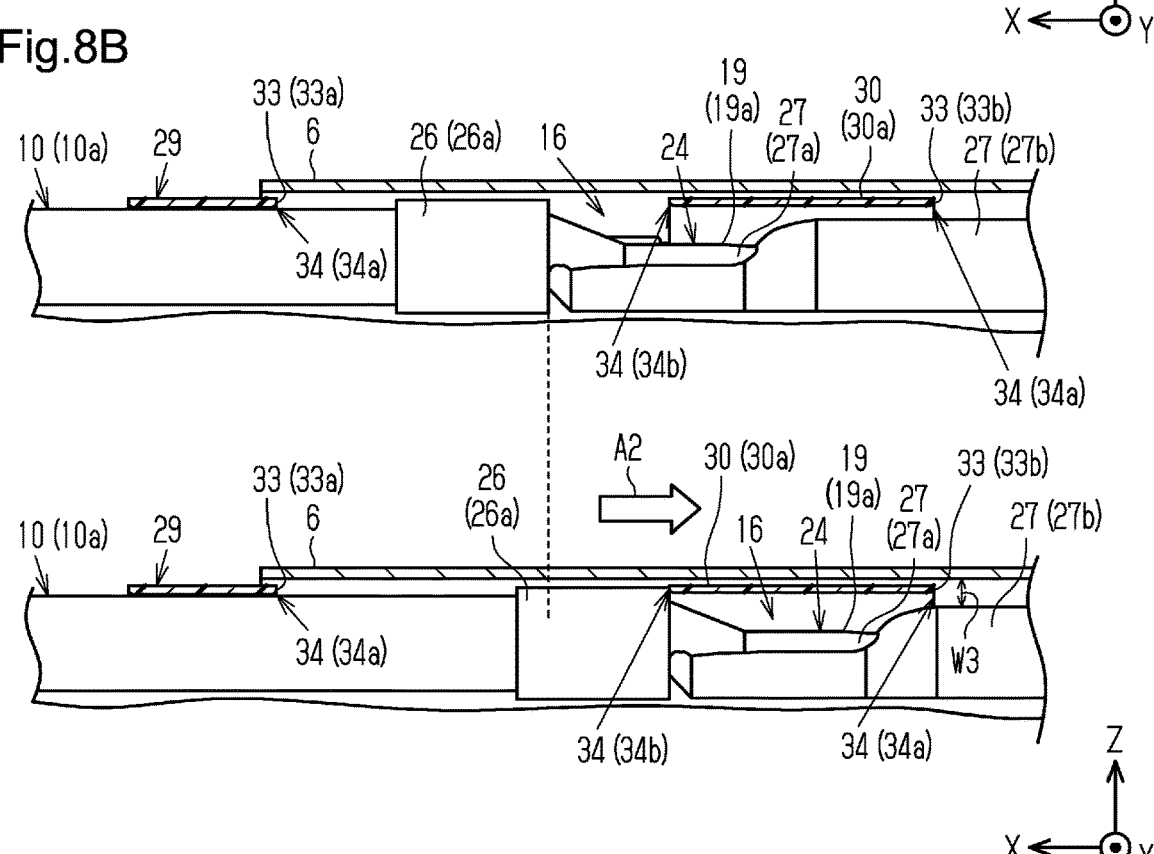

As shown in FIGS. 8A and 8B, the hollow portion 33 has an opening length L (shown in FIG. 8A) that is set so that even when the electric wire member 10 is moved in the holder 29 in the axial direction of the holder 29 (X-axis direction in FIGS. 8A and 8B), the double-insulation portion 26 will not come into contact with the opening ends 34. In the present example, the opening length L is set so that, for example, the double-insulation portion 26 will not come into contact with the opening ends 34 even when the electric wire member 10 is moved from an initial position in a direction in which the electric wire member 10 is drawn out of the holder 29 (arrow A1 direction shown in FIG. 8A) or a direction in which the electric wire member 10 is inserted into the holder 29 (arrow A2 direction shown in FIG. 8B). When the electric wire member 10 is located at the initial position, the double-insulation portion 26 is arranged at the central part of the opening of the hollow portion 33. The opening length Lis, for example, the longitudinal length of the hollow portion 33.

Rotation Restriction 35 of Holder 29

Figure 9:
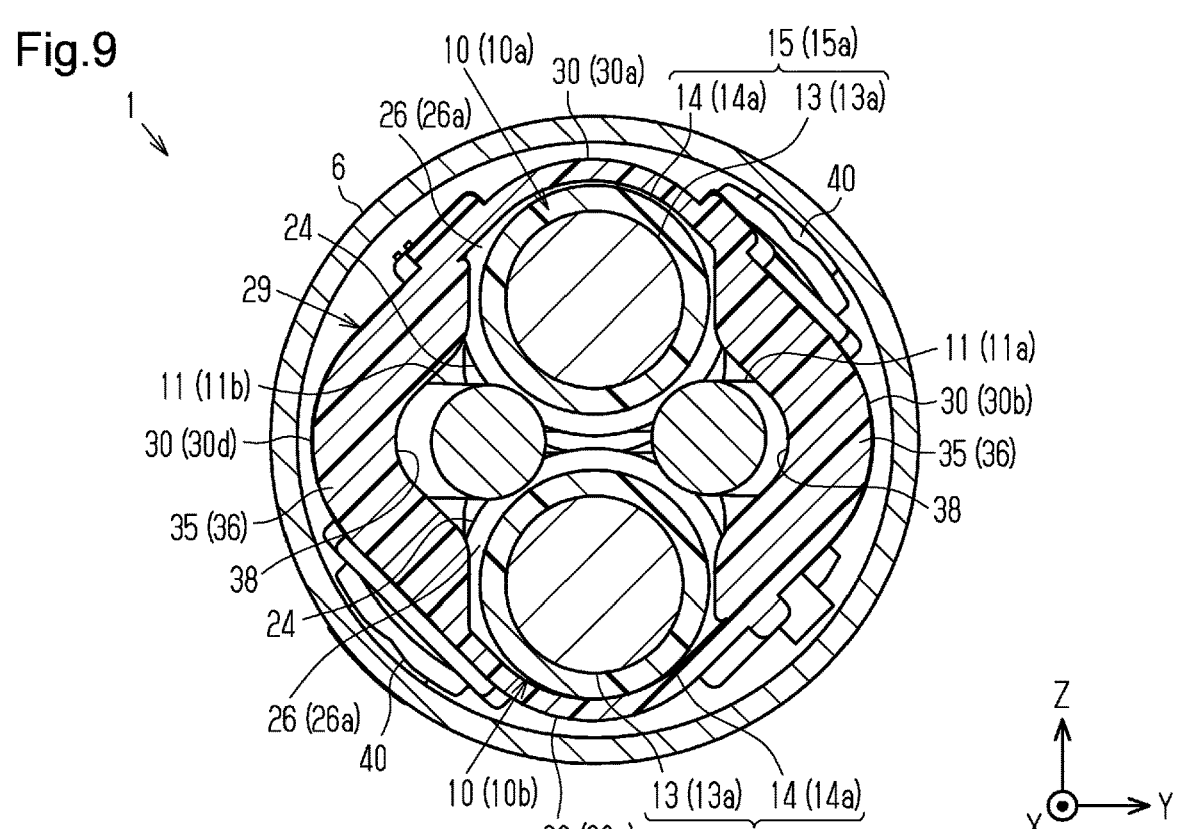
FIG. 9 is a cross-sectional view taken along line IX-IX shown in FIG. 5.
Figure 10:
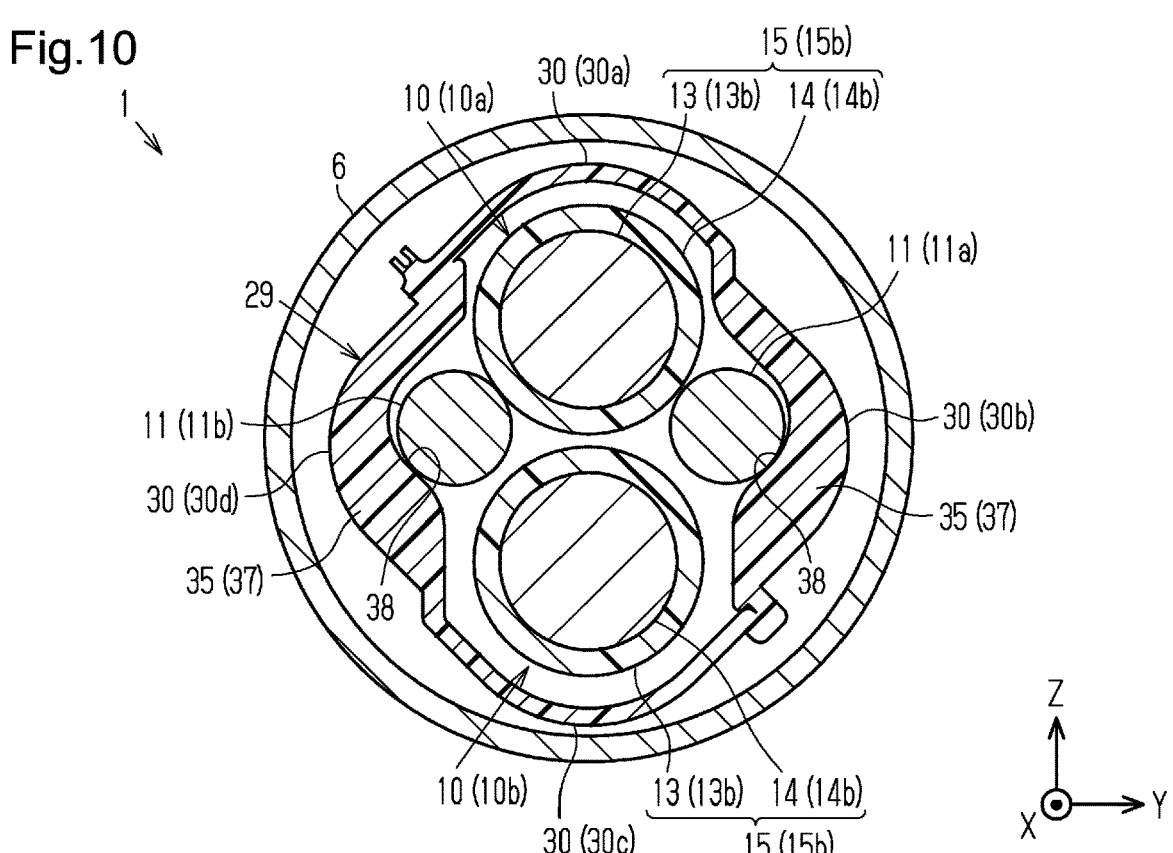
FIG. 10 is a cross-sectional view taken along line X-X shown in FIG. 5.

As shown in FIGS. 9 and 10, the holder 29 includes a rotation restriction 35 configured to restrict rotation of the electric wire members 10 inside the holder 29 in the circumferential direction. The rotation restriction 35 corresponds to two ribs projecting toward the electric wire members 10. The ribs sandwich the electric wire members 10 from two opposite sides. The rotation restriction 35 is, for example, formed locally at predetermined positions inside the holder 29.

The rotation restriction 35 includes a first rotation restriction 36 (shown in FIG. 9) that restricts rotation of the first electric wires 15a inside the holder 29, and a second rotation restriction 37 (shown in FIG. 10) that restricts rotation of the second electric wires 15b inside the holder 29. The first rotation restriction 36 is located toward the distal end of the holder 29 inside the holder 29. The second rotation restriction 37 is located closer to the proximal end of the holder 29 inside the holder 29. The rotation restriction 35 includes a recess 38 that accommodates the small diameter wire 11.

Positioning Member 40 of Holder 29

Figure 11:
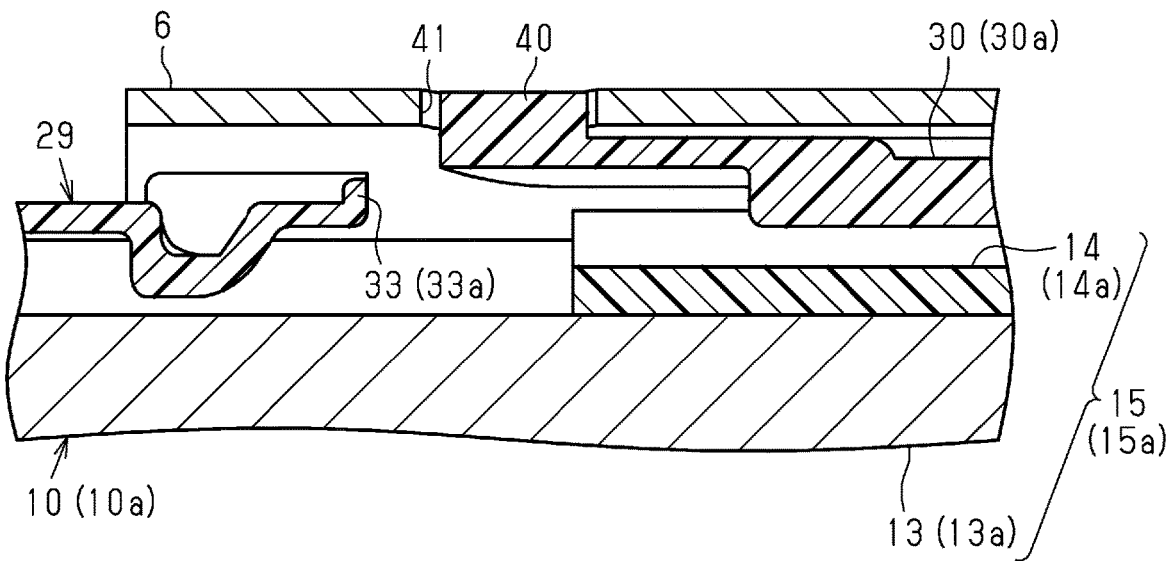
FIG. 11 is an enlarged cross-sectional view showing part of the wire harness.

As shown in FIG. 11, the holder 29 includes a positioning member 40 used to position the holder 29 relative to the tubular member 6 at an end part of the tubular member 6. The positioning member 40 includes, for example, a projection and a lever. Two positioning members 40 are arranged to oppose each other in the vicinity of the distal end of the holder 29. When the holder 29 is inserted into the tubular member 6, each positioning member 40 engages a corresponding recess 41 of the tubular member 6 so that the holder 29 is positioned relative to the tubular member 6. Once the positioning members 40 position the holder 29 relative to the tubular member 6, the holder 29 will not rotate inside the tubular member 6.

The operation of the wire harness 1 according to the present embodiment will now be described.

Holder 29 Protecting Wire Bundle 5 Against Damage

As shown in FIG. 5, the holder 29 extends out of the end part of the tubular member 6 by a predetermined amount. Thus, for example, even if a bending load is applied to the electric wire members 10, the holder 29 will serve as a buffer such that the wire bundle 5 will not come into direct contact with the edge of the tubular member 6. In this manner, the holder 29 protects the wire bundle 5 from damage that would be caused by the edge of the tubular member 6. This avoids insulation failure in the wire bundle 5.

Restriction of Rotation of Electric Wire Member 10

As shown in FIGS. 9 and 10, the rotation restrictions 35 are arranged on the inner circumferential surface of the holder 29 so that the wire bundle 5 will not rotate inside the holder 29 in the circumferential direction. As a result, even if a load is applied to the wire bundle 5 when bending the tubular member 6, which accommodates the wire bundle 5, the rotation restrictions 35 will hold the wire bundle 5 in place. Accordingly, the second electric wire 15b (in the present example, single-core wire) will contact the inner surface of a bend of the tubular member 6 in a uniform manner. This avoids damage to the second insulation sheath 14b.

Further, as shown in FIG. 11, when the two positioning members 40 of the holder 29 are engaged with the recesses 41 of the tubular member 6, the holder 29 is fixed relative to the tubular member 6. This also restricts rotation of the holder 29 relative to the tubular member 6 and avoids damage to the second insulation sheath 14b. Furthermore, the engagement of the positioning member 40 and the recess 41 will limit displacement of the holder 29 relative to the tubular member 6 in the axial direction.

Protection Against External Force Applied to Joint 19

As shown in FIG. 5, for example, the holder 29 supports the peripheral portions of the connected part 16 of the first electric wire 15a and the second electric wire 15b at the opposite sides of the joint 19. Specifically, the thickness of the rotation restrictions 35 of the holder 29 firmly holds both sides of the connected part 16. Thus, the first electric wire 15a and the second electric wire 15b will not become separated at the joint 19 by an external force. This avoids connection failure in the joint 19.

Protection Against Deformation of Covered Portion of Electric Wire Member 10

As shown in FIG. 5, the holder 29 secures the peripheral portions of the connected part 16 of the first electric wire 15a and the second electric wire 15b inside the tubular member 6. The holder 29 reduces gaps around the peripheral portions of the connected part 16 and limits movement of the connected part 16. Thus, the covered portion of the electric wire member 10, specifically, the joint 19, will not be easily deformed by a load. This avoids deformation of the covered portion of the electric wire member 10.

Efficiency for Insertion of Electric Wire Member 10

As shown in FIG. 5, the electric wire member 10 includes the double-insulation portion 26 where the circumference of the core wire 13 is covered by the insulation sheath 14 and the cover member 24. Thus, the double-insulation portion 26 of the electric wire member 10 is thicker in the radial direction than the other portions of the electric wire member 10. The double-insulation portion 26 increases the outer diameter of the holder 29. This may hinder smooth insertion of the wire bundle 5 into the tubular member 6 when manufacturing the wire harness 1 and lower the insertion efficiency of the wire bundle 5 when manufacturing the wire harness 1.

In this respect, as shown in FIG. 3, the holder 29 of the present embodiment includes the hollow portion 33 located at a part where the double-insulation portion 26 of the electric wire members 10 is located. The hollow portion 33 reduces the outer diameter of the holder 29 at the part where the hollow portion 33 is located. This decreases the cable fill ratio inside the tubular member 6 at the part where the double-insulation portion 26 is located and thereby facilitates insertion of the wire bundle 5 through the tubular member 6 when manufacturing the wire harness 1.

Interference of Opening End 34 with Cover Member 24

Figure 12:
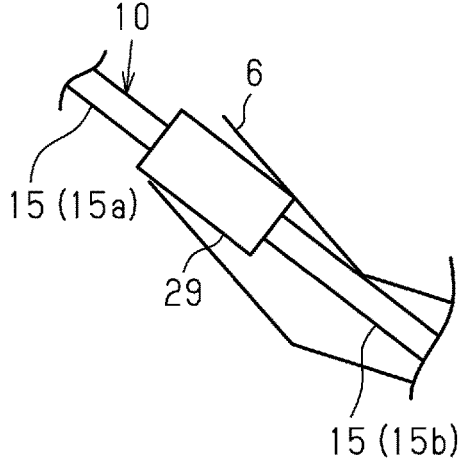
FIG. 12 is a diagram illustrating bending of the wire harness.

As shown in FIG. 12, when bending the tubular member 6, the electric wire member 10 disposed in the tubular member 6 may be pulled by the tubular member 6 and moved in a direction in which the electric wire member 10 is drawn out of the holder 29 (drawing-out direction) or in a direction in which the electric wire member 10 is inserted into the holder 29 (inserting direction). Thus, when the electric wire member 10 is moved, the electric wire member 10 may come into contact with the opening ends 34 in the holder 29, which includes the hollow portion 33 as described above. This may cause damage, connection failure, or the like to the electric wire member 10.

In this respect, as shown in FIGS. 8A and 8B, the opening length L of the hollow portion 33 in the present example is set so that the double-insulation portion 26 will remain separated from the opening ends 34 even when the electric wire member 10 is moved in the drawing-out direction or the inserting direction. Thus, as shown in FIG. 8A, even when the electric wire member 10 is moved in the drawing-out direction, the double-insulation portion 26 will remain separated from the first opening end 34a of the hollow portion 33 located toward the distal end of the holder 29. Further, as shown in FIG. 8B, even when the electric wire member 10 is moved in the inserting direction, the double-insulation portion 26 will not come into contact with the second opening end 34b of the hollow portion 33 located toward the proximal end of the holder 29.

Interference of Cover Member 24 with Tubular Member 6

As shown in FIGS. 8A and 8B, when the holder 29 includes the hollow portion 33, the cover member 24 is exposed from the holder 29. Thus, the first single-insulation portion 27a of the electric wire member 10 may come into contact with the inner circumferential surface of the tubular member 6. Since the first single-insulation portion 27a has only a single layer of insulation around the joint 19, it is preferred that the first single-insulation portion 27a is separated from the inner circumferential surface of the tubular member 6 to avoid, for example, wear, abrasion, and jolting of the first single-insulation portion 27a.

Accordingly, in the present example, as shown in FIG. 8A, the tubular member 6 is sufficiently separated from the first single-insulation portion 27a by distance W2. More specifically, the first single-insulation portion 27a is set to be thinner than the other parts of the electric wire member 10, and the first single-insulation portion 27a is disposed toward the center axis of the holder 29 such that the first single-insulation portion 27a is separated from the inner circumferential surface of the tubular member 6. Therefore, the first single-insulation portion 27a will not come into contact with the inner circumferential surface of the tubular member 6. This also avoids connection failure in the joint 19.

Further, as shown in FIG. 4, the opposite ends of the first single-insulation portion 27a in the widthwise direction (Y-axis direction in FIG. 4) are concealed in the holder 29. Thus, the surrounding portion of the hollow portion 33 of the holder 29 serves as walls that avoid contact between the inner surface of the tubular member 6 and the opposite ends of the first single-insulation portion 27a in the widthwise direction. This further avoids connection failure in the first single-insulation portion 27a.

As shown in FIG. 8A, when the electric wire member 10 is moved in the drawing-out direction (arrow A1 direction), the first single-insulation portion 27a will be greatly exposed from the hollow portion 33. However, in the present example, the first single-insulation portion 27a is sufficiently separated from the inner circumferential surface of the tubular member 6 by distance W2 such that the first single-insulation portion 27a will not come into contact with the inner circumferential surface of the tubular member 6. Thus, even when the electric wire member 10 is moved in the drawing-out direction, the first single-insulation portion 27a will remain separated from the tubular member 6.

As shown in FIG. 8B, when the electric wire member 10 is moved in the inserting direction (arrow A2 direction), the first single-insulation portion 27a will be concealed in the holder 29. Thus, the holder 29 serves as the wall that avoids contact between the first single-insulation portion 27a and the inner circumferential surface of the tubular member 6.

In contrast, the second single-insulation portion 27b will be greatly exposed from the second hollow portion 33b. However, in the present example, the second single-insulation portion 27b is sufficiently separated from the inner circumferential surface of the tubular member 6 by distance W3 such that the second single-insulation portion 27b will not come into contact with the inner circumferential surface of the tubular member 6. Thus, even when the electric wire member 10 is moved in the inserting direction, connection failure will not occur in the second single-insulation portion 27b.

Advantages of the Embodiment

The structure of the above-described embodiment has the following advantages.

(1) The wire harness 1 includes the tubular member 6, the electric wire member 10, the cover member 24, and the holder 29. The electric wire member 10 includes the electric wires 15 connected to each other. The electric wires 15 each have the core wire 13 covered by the insulation sheath 14. The cover member 24 covers the circumference of the connected part 16 of the electric wires 15. The electric wire member 10 is inserted through the tubular member 6. The holder 29 is tubular. The holder 29 is arranged at an end part of the tubular member 6 to protect the electric wire member 10 at a part where the cover member 24 is arranged. The electric wire member 10 includes the double-insulation portion 26 where the core wire 13 is covered by the insulation sheath 14 and the cover member 24. The holder 29 includes the hollow portion 33 at a part where the double-insulation portion 26 is located.

With the present structure, the holder 29 includes the hollow portion 33 at the part where the double-insulation portion 26 is located so as to decrease the cable fill ratio in the tubular member 6. Specifically, the hollow portion 33 reduces the outer diameter of the holder 29 at a part where the hollow portion 33 is located, which is the position where the electric wire member 10 is relatively thick in the radial direction in the tubular member 6. This improves the efficiency for inserting the electric wire members 10 through the tubular member 6.

(2) The electric wires 15 include the first electric wire 15a and the second electric wire 15b connected to the first electric wire 15a. The double-insulation portion 26 includes the first double-insulation portion 26a where the first core wire 13a of the first electric wire 15a is covered by the first insulation sheath 14a of the first electric wire 15a and the cover member 24, and the second double-insulation portion 26b where the second core wire 13b of the second electric wire 15b is covered by the second insulation sheath 14b of the second electric wire 15b and the cover member 24. The hollow portion 33 is located in the holder 29 in at least one of the part where the first double-insulation portion 26a is located and the part where the second double-insulation portion 26b is located. With this structure, the hollow portion 33 reduces the outer diameter of the holder 29 at a part where the hollow portion 33 is located even when the electric wire member 10 includes two double-insulation portions, namely, the first double-insulation portion 26a and the second double-insulation portion 26b, at the connected parts 16 of the electric wires 15. This decreases the cable fill ratio in the tubular member 6 at the part where the double-insulation portion 26 of the electric wire member 10 is located.

(3) The electric wire member 10 includes the joints 19 formed by joining the end portion of the first core wire 13a exposed from the first insulation sheath 14a and the end portion of the second core wire 13b exposed from the second insulation sheath 14b. The joint 19 is thinner than the first core wire 13a and the second core wire 13b. The electric wire member 10 includes the single-insulation portion 27 where at least the joint 19 is covered by only the cover member 24. With this structure, the single-insulation portion 27 at the joint 19 is disposed toward the center axis of the holder 29 so that the single-insulation portion 27 is separated from the tubular member 6. Thus, the single-insulation portion 27 will not come into contact with the tubular member 6, thereby avoiding damage to the single-insulation portion 27.

(4) The first core wire 13a includes a plurality of metal strands. The second core wire 13b is a single-core wire. The joint 19 includes the ends of the metal strands and the flat portion 21 of the end of the single-core wire joined with the ends of the metal strands. With this structure, the first electric wire 15a is flexible, and the second electric wire 15b is rigid. Thus, the electric wire member 10 includes the first electric wire 15a that is flexible and the second electric wire 15b that is rigid.

(5) The holder 29 is polygonal as viewed in the axial direction and includes a plurality of corners 30 arranged in the circumferential direction. The hollow portion 33 is located in least at one of the corners 30.

With this structure, the electric wire members 10 are arranged along the inner surfaces of the corners 30 of the polygonal holder 29. The hollow portion 33 is included in the part where the electric wire members 10 are in contact with the holder 29 so that the hollow portion 33 reduces the outer diameter of the holder 29 at the position of the hollow portion 33. This decreases the cable fill ratio in the tubular member 6 at the part where the double-insulation portion 26 of the electric wire members 10 is located.

(6) The hollow portion 33 extends in the axial direction of the holder 29 and includes the two opening ends 34 at the opposite sides of the hollow portion 33. The opening length L of the hollow portion 33 is set so that the double-insulation portion 26 will not come into contact with the opening ends 34 even when the electric wire members 10 are moved inside the holder 29 in the axial direction of the holder 29. With this structure, even when the electric wire members 10 are moved in the axial direction inside the holder 29, the double-insulation portion 26 will remain separated from the opening ends 34. This avoids damage to the double-insulation portion 26.

(7) The holder 29 includes the rotation restrictions 35 configured to restrict rotation of the electric wire members 10 inside the holder 29 in the circumferential direction. With this structure, the rotation restrictions 35 of the holder 29 positions the electric wire members 10, which are inserted into the holder 29, in the circumferential direction. Accordingly, the second electric wires 15b (in the present example, single-core wire) will contact the inner surface of a bend of the tubular member 6 in a uniform manner. This avoids damage to the second insulation sheath 14b.

(8) The holder 29 includes the positioning member 40 used to position the holder 29 relative to the tubular member 6 at the end part of the tubular member 6. With this structure, the positioning member 40 positions the holder 29 on the tubular member 6 so that the holder 29 and the electric wire members 10, which are arranged in the holder 29, will be held in place. This further avoids damage to the second insulation sheath 14b.

(9) The electric wire member 10 includes a plurality of the electric wire members 10. With this structure, the electric wire members 10 may increase the outer diameter of the holder 29. However, the hollow portion 33 included in the holder 29 reduces the outer diameter of the holder 29 at a part where the hollow portion 33 is located. This sufficiently avoids a situation in which the cable fill ratio in the tubular member 6 becomes high at the part where the double-insulation portion 26 of the electric wire members 10 is located.

OTHER EMBODIMENTS

The present embodiment may be modified as follows. The present embodiment and the following modifications can be combined as long as the combined modifications remain technically consistent with each other.

The number of double-insulation portions 26 disposed at one connected part 16 does not have to be two. Alternatively, there may be only one double-insulation portion 26 disposed at one connected part 16.

The double-insulation portion 26 may include three or more layers of insulation.

In an example in which the columnar portion 20 is omitted, only the joint 19 may have the single-insulation portion 27.

The single-insulation portion 27 may be omitted.

The holder 29 may include two or more hollow portions 33 having different shapes.

The position, the shape, and the size of the hollow portion 33 may be changed from those described in the above embodiment.

The hollow portion 33 does not have to be a through hole and may be, for example, a recess.

The joint 19 does not have to have the form of a substantially flat plate and may be changed in shape to be, for example, a cylindrical.

The holder 29 may be arranged at only one end part of the tubular member 6.

The holder 29 is not limited to a quadrangular cross section as long as the cross section is polygonal. Alternatively, the holder 29 may have a circular (true circle) or elliptic cross section as viewed in the axial direction.

The number of electric wire members 10 and the number of small diameter wires 11 inserted through the holder 29 may be changed.

The wire harness 1 is not limited to a vehicle on-board device and may be used in other products or devices.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of two or more choices" if the number of its choices three or more.

The cable fill ratio corresponds to a ratio of the diameter of a circle that circumscribes a cross section of the holder 29 to the inner diameter of the tubular member 6. The cable fill ratio may also be referred to as the cable fill ratio in the tubular member 6 in a cross-sectional view.

As shown in FIG. 5. the holder 29 may be inserted through the end part of the tubular member 6 in a state in which the wire bundle 5 is inserted in the holder 29.

As shown in FIGS. 5 and 8, the holder 29 may be arranged such that the double-insulation portion 26 does not protrude radially outward from the outer surface of the holder 29 through the hollow portion 33.

As shown in FIGS. 5 and 8, the opening length L of the hollow portion 33 may be two or more times greater than the length of the double-insulation portion 26 of the electric wire member 10 in the longitudinal direction. As shown in FIG. 6, the opening width of the hollow portion 33 may be less than the outer diameter of the double-insulation portion 26.

As shown in FIGS. 3, 4, 6, and 7, the first small diameter wire 11a may be arranged on the inner surface of the second corner 30b of the holder 29, the second small diameter wire 11b may be arranged on the inner surface of the fourth corner 30d of the holder 29, and the second corner 30b and the fourth corner 30d do not have to include hollow portions.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A wire harness, comprising:
an electric wire member including electric wires connected to each other, the electric wires each have a core wire covered by an insulation sheath;
a cover member that covers a circumference of a connected part of the electric wires;
a tubular member through which the electric wire member is inserted; and
a tubular holder arranged at an end part of the tubular member and protecting the electric wire member at a part where the cover member is arranged, wherein
the wire harness includes double-insulation portions where the core wire is covered by the insulation sheath and the cover member,
the holder includes hollow portions at parts where the double-insulation portions are located,
the electric wires include a first electric wire and a second electric wire that is connected to the first electric wire,
the double-insulation portions include a first double-insulation portion where a first core wire of the first electric wire is covered by a first insulation sheath of the first electric wire and the cover member, and a second double-insulation portion where a second core wire of the second electric wire is covered by a second insulation sheath of the second electric wire and the cover member,
the hollow portions include a first hollow portion formed at a part where the first double-insulation portion is located, and a second hollow portion formed at a part where the second double-insulation portion is located, and
in the axial direction of the holder, the electric wire member is covered by the holder at one axial end side of the first hollow portion, between the first hollow portion and the second hollow portion, and at the opposite axial end side of the second hollow portion.

2. The wire harness according to claim 1, wherein
the electric wire member includes a joint including an end portion of the first core wire exposed from the first insulation sheath and an end portion of the second core wire exposed from the second insulation sheath joined with the end portion of the first core wire; and
the joint is thinner than the first core wire and the second core wire, and
the wire harness includes a single-insulation portion where at least the joint is covered by only the cover member.

3. The wire harness according to claim 2, wherein
the first core wire includes a plurality of metal strands,
the second core wire is a single-core wire, and
the joint includes ends of the metal strands and a flat portion of an end of the single-core wire joined with the ends of the metal strands.

4. The wire harness according to claim 1, wherein
the holder is polygonal as viewed in the axial direction and includes a plurality of corners arranged in a circumferential direction, and
the hollow portion is included in at least one of the corners.

5. The wire harness according to claim 1, wherein the hollow portion extends in the axial direction of the holder and includes two opening ends at opposite sides of the hollow portion, and the hollow portion has an opening length that is set so that the double-insulation portion does not come into contact with the opening ends of the hollow portion even when the electric wire member is moved inside the holder in the axial direction of the holder.

6. The wire harness according to claim 1, wherein the holder includes a rotation restriction configured to restrict rotation of the electric wire member inside the holder in a circumferential direction.

7. The wire harness according to claim 1, wherein the holder includes a positioning member used to position the holder relative to the tubular member at the end part of the tubular member.

8. The wire harness according to claim 1, wherein the electric wire member is one of a plurality of electric wire members included in the wire harness.

9. The wire harness according to claim 1, wherein the holder is arranged such that the double-insulation portions do not protrude radially outward from an outer surface of the holder through the hollow portions, and an opening length of each of the hollow portions is two or more times greater than a length of each of the double-insulation portions in a longitudinal direction of the electric wire member, and an opening width of each of the hollow portions is less than an outer diameter of each of the double-insulation portions.

10. The wire harness according to claim 1, wherein the wire harness includes small diameter wires each having a diameter smaller than a diameter of each of the electric wire members, the holder is polygonal as viewed in the axial direction and includes a first corner, a second corner located at a position shifted from the first corner by ninety degrees in the clockwise direction, a third corner located at a position opposite to the first corner, and a fourth corner located at a position opposite to the second corner in the circumferential direction, the electric wire members include a first electric wire member arranged on an inner surface of the first corner of the holder, and a second electric wire member arranged on an inner surface of the third corner of the holder, the first small diameter wire is arranged on the inner surface of the second corner of the holder, the second small diameter wire is arranged on the inner surface of the fourth corner of the holder, and the hollow portions are formed only in at least one of the first corner and the third corner.

\* \* \* \* \*